United States Patent
Kuhn et al.

(10) Patent No.: US 8,887,559 B2
(45) Date of Patent: Nov. 18, 2014

(54) METHOD AND DEVICE FOR DIAGNOSING CRANKCASE VENTILATION OF INTERNAL COMBUSTION ENGINES

(75) Inventors: Daniel Kuhn, Walddorfhaeslach (DE); Stefan Michael, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 6 days.

(21) Appl. No.: 13/820,987

(22) PCT Filed: Sep. 7, 2011

(86) PCT No.: PCT/EP2011/065450
§ 371 (c)(1),
(2), (4) Date: May 17, 2013

(87) PCT Pub. No.: WO2012/034907
PCT Pub. Date: Mar. 22, 2012

(65) Prior Publication Data
US 2013/0228006 A1  Sep. 5, 2013

(30) Foreign Application Priority Data
Sep. 16, 2010 (DE) .......... 10 2010 040 900

(51) Int. Cl.
*G01M 15/04* (2006.01)
*F02D 41/22* (2006.01)
*F01M 13/00* (2006.01)

(52) U.S. Cl.
CPC ............. *G01M 15/04* (2013.01); *Y02T 10/40* (2013.01); *F01M 2013/0005* (2013.01); *F02D 41/22* (2013.01); *F01M 13/00* (2013.01)
USPC .................................... 73/114.33; 73/114.37

(58) Field of Classification Search
USPC ........................................ 73/114.33, 114.37
See application file for complete search history.

(56) References Cited

U.S. PATENT DOCUMENTS

| | | | | |
|---|---|---|---|---|
| 5,792,949 A | * | 8/1998 | Hewelt et al. | 73/114.01 |
| 5,897,597 A | * | 4/1999 | O'Daniel | 123/574 |
| 6,098,603 A | * | 8/2000 | Maegawa et al. | 123/572 |
| 6,412,478 B1 | * | 7/2002 | Ruehlow et al. | 123/572 |
| 6,779,388 B2 | * | 8/2004 | Baeuerle et al. | 73/114.31 |
| 7,080,547 B2 | * | 7/2006 | Beyer et al. | 73/114.37 |
| 7,567,867 B2 | * | 7/2009 | Herz et al. | 701/114 |
| 7,878,049 B2 | * | 2/2011 | Roal et al. | 73/114.37 |

(Continued)

FOREIGN PATENT DOCUMENTS

| | | |
|---|---|---|
| DE | 100 26 492 | 11/2001 |
| DE | 10 2007 050 087 | 6/2009 |
| DE | 10 2008 002721 | 12/2009 |

OTHER PUBLICATIONS

International Search Report for PCT/EP2011/065450, dated Jan. 23, 2012.

*Primary Examiner* — Freddie Kirkland, III
(74) *Attorney, Agent, or Firm* — Kenyon & Kenyon LLP

(57) ABSTRACT

A method for checking the functioning of a ventilation apparatus for ventilating a crankcase connected via the ventilation apparatus to an air supply system of the internal combustion engine includes: determining a pressure difference between an ambient pressure and a crankcase pressure in the crankcase; identifying a fault in the ventilating apparatus as a function of the pressure difference if an enabling condition is met; the enabling condition being met if an air mass flow in the air supply system, filtered by a low-pass filter, exceeds a first threshold value in terms of absolute value.

8 Claims, 4 Drawing Sheets

(56) References Cited

U.S. PATENT DOCUMENTS

| | | | |
|---|---|---|---|
| 8,145,406 B2 * | 3/2012 | Satou | 701/103 |
| 8,342,012 B2 * | 1/2013 | Jach et al. | 73/114.32 |
| 8,443,784 B2 * | 5/2013 | Brennan | 123/435 |
| 2001/0047801 A1 * | 12/2001 | Baeuerle et al. | 123/574 |
| 2002/0083934 A1 | 7/2002 | Ruehlow et al. | |

* cited by examiner

METHOD AND DEVICE FOR DIAGNOSING CRANKCASE VENTILATION OF INTERNAL COMBUSTION ENGINES

BACKGROUND OF THE INVENTION

1. Field of the Invention

The present invention relates to internal combustion engines in which the crankcase is ventilated into an air supply system. The invention further relates to a method for diagnosing the ventilation system of the internal combustion engine.

2. Description of the Related Art

In internal combustion engines, a discharge of combustion waste gases can occur as a result of leakage effects at the cylinder walls of the cylinders. These combustion waste gases collect in the crankcase and as a rule are vented via an oil separator unit and a gas line, for example a hose, into the air supply system of the internal combustion engine. In order to comply with emissions limits of emissions regulations, it is necessary for the ventilation of the crankcase to be monitored as to whether a defect in the gas line between the crankcase and the oil separator unit, and between the oil separator unit and the air supply system, can reliably be detected by diagnosis.

There are various concepts for diagnosing the functionality of crankcase ventilation. On the one hand, electrical contacts can be provided on the gas lines between the crankcase and oil separator unit, and between the oil separator unit and air supply system, which contacts are opened when the gas line becomes detached or severed so that a fault can thereby be detected. Furthermore, a sealing failure in the gas lines can be detected with the boost pressure sensor by plausibilizing an air mass sensor that is disposed on the input side of the air supply system. A disadvantage here is the fact that because there are many possibilities for faults in the air supply system, an implausibility cannot be unequivocally allocated to a fault in the gas line for ventilating the crankcase.

A further possibility is to provide a differential pressure sensor between the crankcase and the environment. In the intact state, the pressure in the crankcase is lower than ambient pressure, since a pressure drop occurs in the air supply system of the internal combustion engine due to the air filter. In addition, the opening of the gas line for ventilating the crankcase generally extends transversely to the flow profile in the air supply system, so that a negative pressure occurs in the ventilation gas line because of a Venturi effect. If a fault occurs in the gas line for ventilating the crankcase, then approximately ambient pressure exists in the crankcase. With the aid of the differential pressure sensor, a pressure drop between the crankcase and the environment can be associated with a properly functioning crankcase ventilation system, and can be evaluated in a diagnostic function.

Because the pressure differences between the crankcase and ambient pressure are generally very small, implementation of the diagnostic function requires a differential pressure sensor having very small tolerances and, in some circumstances, operating points at which a high mass air flow exists in the air supply system, in order to effect a differentiation between a properly functioning and a non-functioning ventilation system.

BRIEF SUMMARY OF THE INVENTION

It is therefore an object of the present invention to make available a method and an apparatus for checking a function of a ventilation system of a crankcase that is robust and can be used with a differential pressure sensor having low demands in terms of measurement tolerance.

According to a first aspect, a method for checking the functioning of a ventilation apparatus for ventilating a crankcase of an internal combustion engine is provided, the crankcase being connected via the ventilation apparatus to an air supply system of the internal combustion engine. The method encompasses the following steps:

determining a pressure difference between an ambient pressure and a crankcase pressure in the crankcase;

identifying a fault in the ventilating apparatus as a function of the pressure difference if an enabling condition is met, the enabling condition being met if an air mass flow in the air supply system, filtered by a low-pass filter, exceeds a first threshold value in terms of absolute value.

One idea of the method above consists in taking into account, for executing the diagnosis of the ventilating apparatus, the differing dynamics of the air mass flow in the air supply system and the differential pressure between the crankcase and environment. The diagnostic function on which the method is based, and in which proper functioning of the ventilation apparatus is checked, is enabled only if a correspondingly high differential pressure is expected.

Thanks to the above method, diagnostic robustness can be increased and/or it is possible to use a differential pressure sensor in which lesser requirements in terms of tolerances are imposed.

In addition, low-pass filtering of the air mass flow can be carried out using a time constant which is predefined in such a way that it is equal to or greater than a time constant that results from a time-delayed response of the crankcase pressure upon a change in air mass flow.

According to an embodiment, the fault in the ventilation apparatus can be identified as a function of the pressure difference with the aid of a threshold value comparison.

In particular, the fault in the ventilation apparatus can be identified with the aid of the threshold value comparison as a function of a pressure difference debounced by a further low-pass filter.

Provision can be made for the further low-pass filter to have a time constant that is dependent on the air mass flow, in particular on the filtered air mass flow, in particular depends linearly on the air mass flow or the filtered air mass flow. The operating-point-dependent filtering of the measured differential pressure between the crankcase and ambient pressure allows the enabling limits to be raised, ensuring an enabling frequency.

The threshold value comparison can be carried out with reference to a pressure difference threshold value, the pressure difference threshold value being dependent on the filtered air mass flow.

According to a further aspect, an apparatus for checking the functioning of a ventilation apparatus for ventilating a crankcase of an internal combustion engine is provided, the crankcase being connected via the ventilation apparatus to an air supply system of the internal combustion engine, the apparatus being embodied to determine a pressure difference between an ambient pressure and a crankcase pressure in the crankcase; and identify a fault in the ventilating apparatus as a function of the pressure difference if an enabling condition is met, the enabling condition being met if an air mass flow in the air supply system, filtered by a low-pass filter, exceeds a first threshold value in terms of absolute value.

According to a further aspect, an engine system having an internal combustion engine is provided, in which a ventilation apparatus for ventilating a crankcase of an internal combustion engine is provided, and the crankcase is connected via the ventilation apparatus to an air supply system of the internal combustion engine, and having the above apparatus.

According to a further aspect, a computer program product is provided which contains a program code that, when it is executed on a data processing unit, carries out the above method.

DETAILED DESCRIPTION OF THE INVENTION

Figure 1:
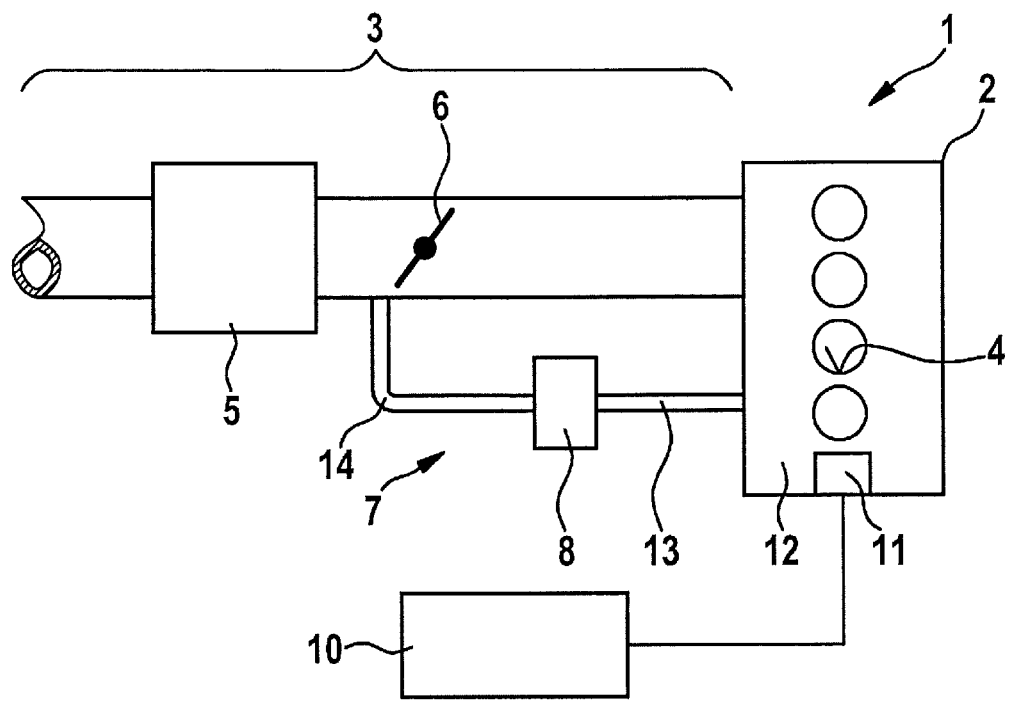
FIG. 1 schematically depicts an engine system having a ventilation apparatus between the crankcase and the air supply system.

FIG. 1 is a block depiction of an engine system 1 having an internal combustion engine 2 to which air is supplied via an air supply system 3 having an air conduit. The air supplied via air supply system 3 is admitted into cylinders 4 of internal combustion engine 2 under the control of intake valves (not shown). Air supply system 3 has on the intake side an air filter 5 in order to filter out particles from the aspirated fresh air. Air supply system 3 furthermore has a throttle valve 6 that controls the air flow supplied to cylinders 4 of internal combustion engine 2.

Internal combustion engine 2 is disposed in an engine block that encloses a region 12 in which the crankshaft is disposed and is connected to pistons in cylinders 4. This region 12 is called the crankcase. As a result of leakage effects at the cylinder walls, so-called blow-by gases are conveyed to crankcase 12 and collect in the interior of crankcase 12. To prevent the gases present in crankcase 12 from making their way into the environment, a ventilation apparatus 7 is provided which connects crankcase 12 to air supply system 3.

Ventilation apparatus 7 encompasses a first ventilation line segment 13 and a second ventilation line segment 14, which are separated from one another by an oil separator unit 8. First ventilation line segment 13 connects crankcase 12 to oil separator unit 8, and second ventilation line segment 14 connects oil separator unit 8 to air supply system 3. Oil separator unit 8 serves to prevent oil from being entrained out of crankcase 12 as gases flow from crankcase 12 into air supply system 3, and thus traveling into air supply system 3.

In order for a constant negative pressure to be established in crankcase 12, second ventilation line segment 14 opens into a region of air supply system 3 in which a pressure lower than ambient pressure exists. For this purpose, second ventilation line segment 14 can open into air supply system 3, for example, on the output side of air filter 5.

A control unit 10 is provided for controlling the operation of internal combustion engine 2. In particular, control unit 10 controls throttle valve 6 and further actuators, as a function of measured or modeled system states, in such a way that internal combustion engine 2 delivers a drive torque corresponding to a setpoint torque.

Diagnostic functions are, as a rule, implemented in control unit 10 (or in another monitoring unit) to check the functioning of the individual components of engine system 1. One of the diagnostic functions provides for measuring and evaluating, with the aid of a differential pressure sensor 11 disposed in crankcase 12 of internal combustion engine 2, the pressure difference between ambient pressure and the pressure in crankcase 12 (crankcase pressure).

As a rule, the difference between the crankcase pressure and ambient pressure is evaluated with reference to a threshold value, i.e. if the differential pressure is below a specific threshold value, a fault in ventilation apparatus 7 is then detected. Such faults can occur, for example, due to detachment of one of ventilation line segments 13, 14 from air supply system 3, from oil separator unit 8, or from crankcase 12. Further fault possibilities involve a sealing failure of one of ventilation line segments 13, 14 or of oil separator unit 8.

Because the pressure differences that are measured by differential pressure sensor 11 and evaluated in control unit 10 are small, a robust functional check requires definition of an enabling condition which ensures that when ventilation apparatus 7 is functioning properly, a sufficient pressure difference exists between the crankcase pressure and ambient pressure. The enabling condition can be defined as a function of an indication of the air mass flow through air supply system 3.

Upon a dynamic change in states in air supply system 3, e.g. a change in the air mass flow, the air pressure in crankcase 12 can become established with a time delay in accordance with the air pressure at the opening point of second ventilation line segment 14. The result of this, in some circumstances, can be that an enabling condition based on the value of the air mass flow can already activate the function for checking the proper functioning of ventilation apparatus 7 even before a gas pressure resulting in a sufficiently large pressure difference is present in crankcase 12.

The ascertained pressure difference between the crankcase pressure and ambient pressure is compared with a differential pressure threshold value in order to ascertain whether ventilation line 7 is fault-free. In the event of an abrupt rise in the air mass flow, the result can be that even though ventilation apparatus 7 is functioning properly, the measured differential pressure is not sufficiently high despite the fact that the enabling condition for enabling diagnosis is met.

Figure 2:
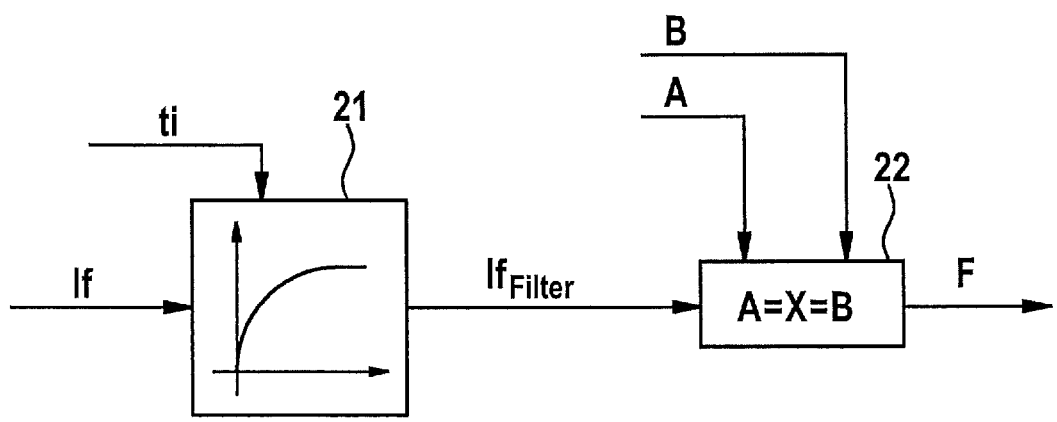
FIG. 2 is a functional diagram to illustrate the method for checking the functioning of the crankcase ventilation system.

FIG. 2 shows the identification of the enabling condition for diagnosis of ventilation apparatus 7. Provision is therefore made that an indication as to the air mass flow If (obtained, for example, from an air mass flow sensor in the air supply system) is firstly filtered in a low-pass filter block 21 in accordance with a low-pass filter function having a predefined time constant ti, in order to obtain an indication of a filtered air mass flow $If_{Filter}$. The filtered air mass flow $If_{Filter}$ is subjected to a threshold value comparison in a threshold value block 22 in order to check for the existence or nonexistence of an enabling condition. The predefined time constant ti of the low-pass filter is preferably selected so that it corresponds substantially to, or is greater than, a time constant with which a change in the air mass flow has an effect on a change in the pressure in crankcase 12.

Lastly, checking of proper functioning of ventilation apparatus 7 is enabled if the filtered air mass flow $If_{Filter}$ exceeds a predefined first threshold value A. Provision can additionally be made to deactivate functional checking if the filtered air mass flow exceeds a second, greater threshold value B.

The dynamics simulated by low-pass filter block 21 are intended to simulate storage effects in ventilation apparatus 7 and in the volume of that region of air supply system 3 into which second ventilation line segment 14 opens.

Figure 3:
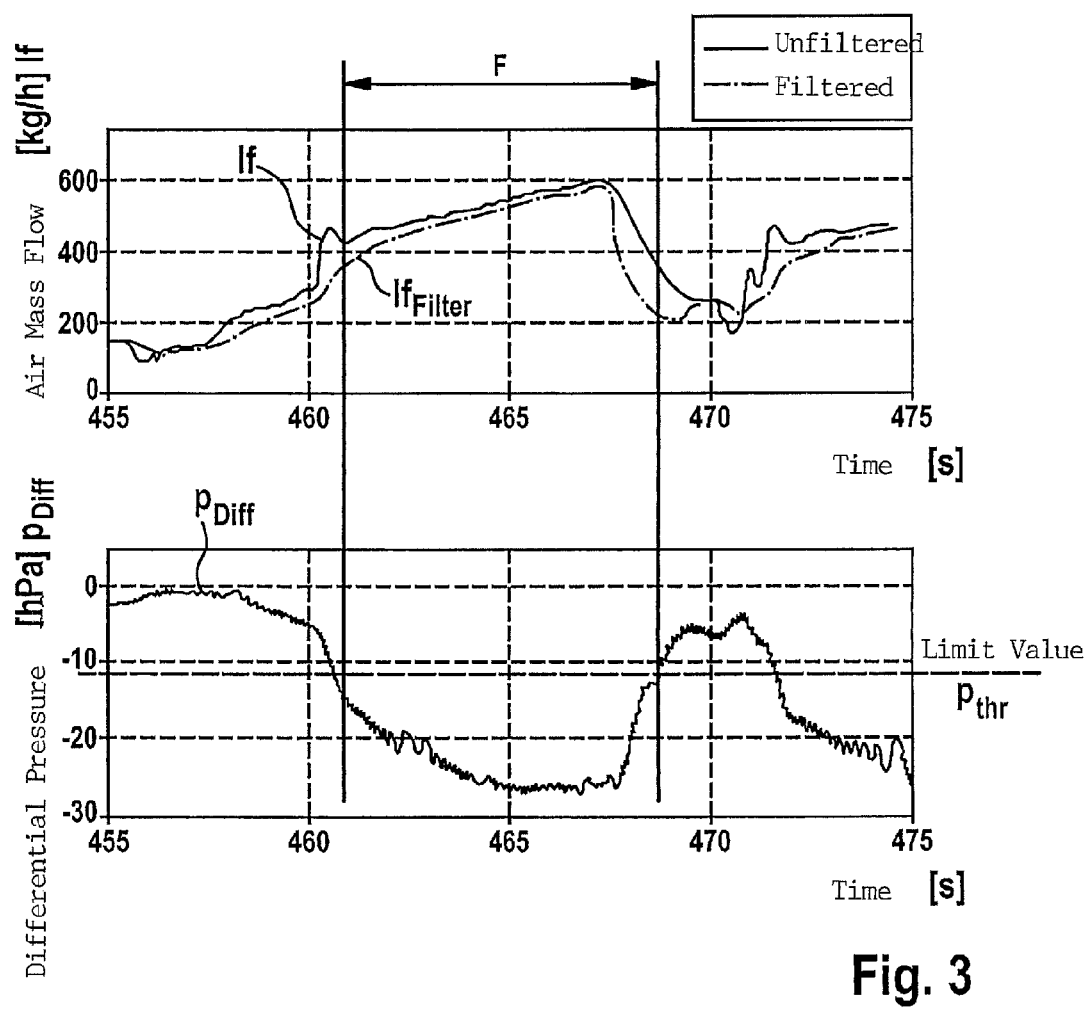
FIG. 3 shows, as an example, time profiles of the air mass flow in an air supply system and of the resulting differential pressure in the crankcase.

This is depicted in the diagrams of FIG. 3 using an example. The diagrams of FIG. 3 shows the time profiles of the air mass flow If and the corresponding differential pressure $p_{Diff}$ in crankcase 12. In the example shown, checking of the functioning of the crankcase ventilation system is enabled as soon as the filtered air mass flow exceeds 370 kg/h. With reference to this first threshold value A, a differential pressure threshold value of −12 hPa is defined. Proper functioning of the crankcase ventilation system can thus be inferred If the absolute value of the measured differential pressure is in a range >12 hPa.

It is evident that this limit value would be reached sooner in the context of the unfiltered air mass flow If, and that the absolute value of the corresponding measured differential pressure $p_{Diff}$ at this point in time would be well below 10 hPa (less than −10 hPa), approximately 5 hPa. In this case, the range within which a distinction would need to be made between a properly or improperly functioning crankcase ventilation system would then be between 5 hPa and 0 hPa. This necessitates the use of a more sensitive differential pressure sensor 11.

Figure 4A:
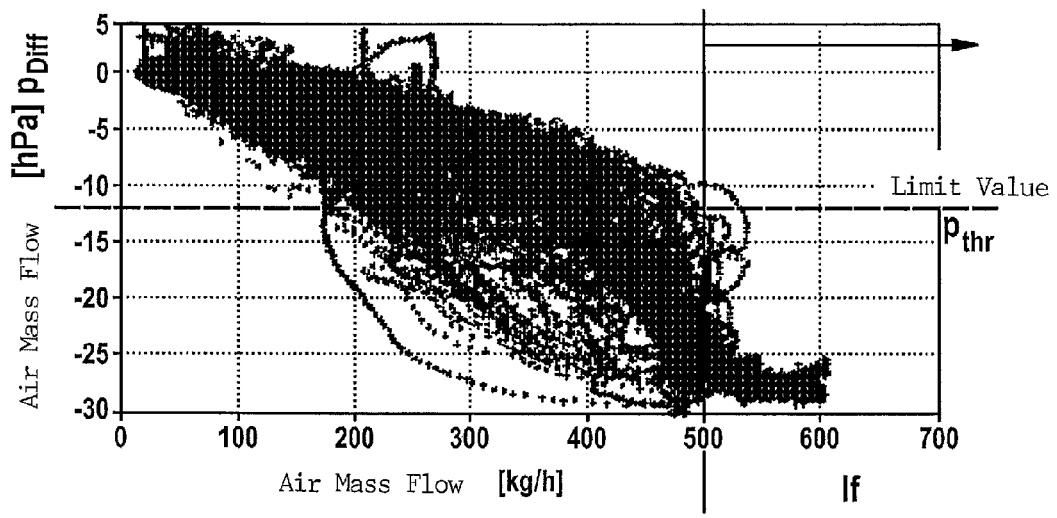
FIGS. 4a and 4b are diagrams to depict differential pressures plotted against air mass flow in the air supply system for an unfiltered air mass flow and filtered air mass flow, for different operating points of the internal combustion engine.
Figure 4B:
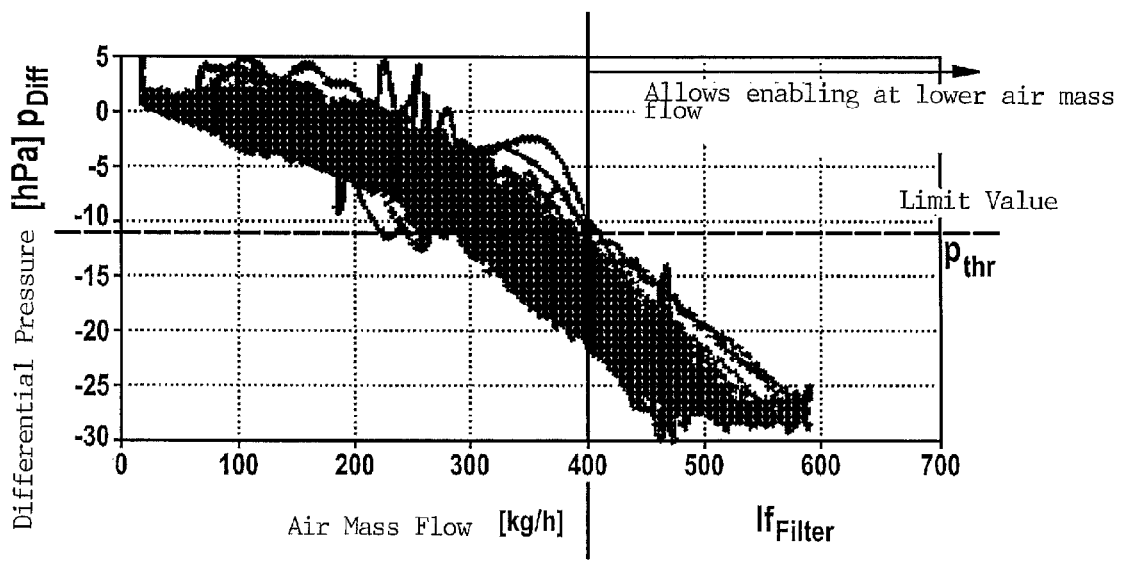
Figure 5:
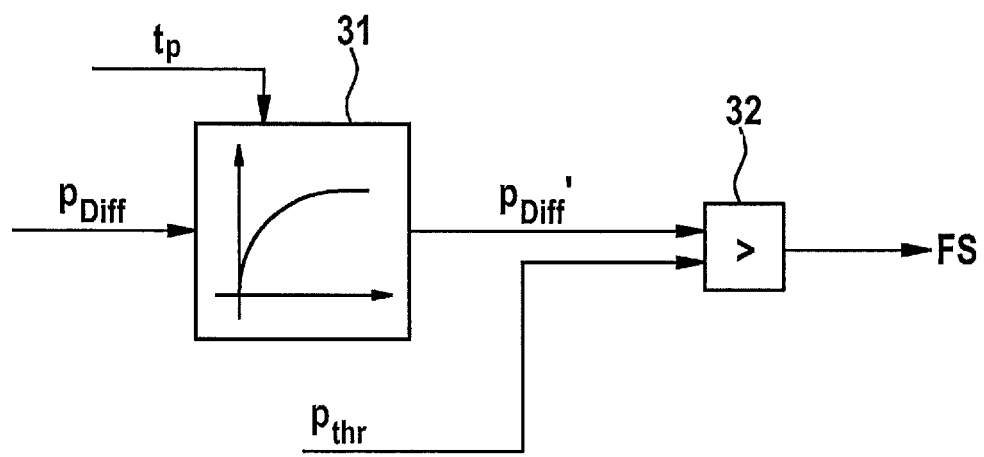
FIG. 5 is a functional diagram to depict filtering, as a function of range or operating point, of the measured differential pressure in order to ascertain the functioning of the crankcase ventilation system.

It is clear from FIGS. 4a and 4b, on the basis of a diagram in which the differential pressure is plotted against air mass flow for various operating points that are arrived at in different ways, that when an unfiltered air mass flow If is used and when the differential pressure threshold value $p_{thr}$ remains the same, a much greater air mass flow threshold value than the first threshold value A must be assumed for enabling than in the case where the filtered air mass flow $If_{Filter}$ is used.

It is thus possible, when applying filtering for the air mass flow If for determination of an enabling condition, to select the first threshold value A in such a way that the enabling condition is met more frequently. Alternatively, for the same first threshold value A for the air mass flow, it is possible to provide a differential pressure sensor 11 having a lower sensitivity, since for example at a first threshold value A of 500 kg/h, a differential pressure threshold value $p_{thr}$ of approx. 19 hPa would be sufficient.

In order to obtain a robust measured value for the differential pressure $p_{Diff}$ between crankcase 12 and the environment, it can be filtered with a low-pass in a differential pressure low-pass filter 31. The time constant $t_p$ in differential pressure low-pass filter 31 can be selected as a function of the filtered air mass flow $If_{Filter}$. The function according to which the time constant $t_p$ is selected can provide that greater time constants can be provided at low mass flows (mass flows lower than the first air mass flow threshold value), at which differentiability exists but is not yet optimal, than at higher mass flows. Differential pressure low-pass filtering of this kind serves for operating-point-dependent debouncing of the measured value of the differential pressure $p_{Diff}$.

The debounced differential pressure $p_{Diff}$ can then be subjected to a threshold value comparison in a further threshold value block 32, in which the debounced differential pressure $p_{Diff}$ is compared with the differential pressure threshold value $p_{thr}$ in order to obtain, in the form of a fault signal FS, an indication as to proper or improper functioning of the checking of the crankshaft ventilation system. If the absolute value of the debounced differential pressure $p_{Diff}$ falls below the differential pressure threshold values $p_{thr}$, or if the debounced differential pressure $p_{Diff}$ exceeds the differential pressure threshold value $p_{thr}$, improper functioning of the crankcase ventilation system can then be inferred, and vice versa.

As described above, the differential pressure threshold value $p_{thr}$ can be ascertained continuously or as a function of the filtered air mass flow $If_{Filter}$ or furthermore as a function of a boost pressure (for a supercharged internal combustion engine). In particular, in view of the measured values of FIG. 4b, it is possible to set the differential pressure threshold value $p_{thr}$ at the upper limit range of the operating point depicted in FIG. 4b. For example, the differential pressure threshold value $p_{thr}$ can be selected in accordance with a linear function having a negative slope with reference to the filtered air mass flow $If_{Filter}$. For the examples of FIG. 4b, this can mean that a differential pressure threshold value of −22 pHa can be selected at an air mass flow of 550 kg/h, and a differential pressure threshold value of −10 hPa at an air mass flow of 400 kg/h.

Debouncing of the differential pressure $p_{Diff}$ by way of a larger enabling time range and operating range makes it possible to minimize interference resulting from system influences, point-to-point flows, and the like. Provision can furthermore be made that the threshold value comparison of the debounced (filtered) differential pressure $p_{Diff}$ with reference to the differential pressure threshold value $p_{thr}$ is enabled only when a cumulative enabling time span has been exceeded, that time span corresponding to a cumulative time span during which the enabling condition for checking the functioning of the crankcase ventilation system has existed.

What is claimed is:

1. A method for checking the functioning of a ventilation apparatus for ventilating a crankcase of an internal combustion engine, wherein the crankcase is connected via the ventilation apparatus to an air supply system of the internal combustion engine, comprising:
    determining a pressure difference between an ambient pressure and a crankcase pressure in the crankcase; and
    identifying a fault in the ventilation apparatus as a function of the pressure difference if an enabling condition is met, wherein the enabling condition is met if an air mass flow in the air supply system, filtered by a low-pass filter, exceeds a first threshold value.

2. The method as recited in claim 1, wherein the low-pass filtering of the air mass flow is carried out using a predefined time constant which is equal to or greater than a time constant which results from a time-delayed response of the crankcase pressure upon a change in air mass flow.

3. The method as recited in claim 1, wherein the fault in the ventilation apparatus is identified as a function of the pressure difference with the aid of a threshold value comparison.

4. The method as recited in claim 3, wherein the fault in the ventilation apparatus is identified with the aid of the threshold value comparison as a function of a pressure difference debounced by a further low-pass filter.

5. The method as recited in claim 4, wherein the further low-pass filter has a time constant linearly dependent on the air mass flow.

6. The method as recited in claim 4, wherein the threshold value comparison is carried out with reference to a pressure difference threshold value which is dependent on the filtered air mass flow.

7. An apparatus for checking the functioning of a ventilation apparatus for ventilating a crankcase of an internal combustion engine, wherein the crankcase is connected via the ventilation apparatus to an air supply system of the internal combustion engine, comprising:
    means for determining a pressure difference between an ambient pressure and a crankcase pressure in the crankcase; and means for identifying a fault in the ventilation apparatus as a function of the pressure difference if an enabling condition is met, wherein the enabling condition is met if an air mass flow in the air supply system, filtered by a low-pass filter, exceeds a first threshold value.

8. A non-transitory computer-readable data storage medium storing a computer program having program codes which, when executed on a computer, performs a method for checking the functioning of a ventilation apparatus for ventilating a crankcase of an internal combustion engine, wherein the crankcase is connected via the ventilation apparatus to an air supply system of the internal combustion engine, the method comprising:

determining a pressure difference between an ambient pressure and a crankcase pressure in the crankcase; and identifying a fault in the ventilation apparatus as a function of the pressure difference if an enabling condition is met, wherein the enabling condition is met if an air mass flow in the air supply system, filtered by a low-pass filter, exceeds a first threshold value.

* * * * *